US012617469B2

(12) United States Patent
Boettcher

(10) Patent No.: US 12,617,469 B2
(45) Date of Patent: May 5, 2026

(54) REINFORCEMENT ASSEMBLY FOR A SIDE SILL OF A VEHICLE

(71) Applicant: Honda Motor Co., Ltd., Tokyo (JP)

(72) Inventor: Eric J. Boettcher, Columbus, OH (US)

(73) Assignee: Honda Motor Co., Ltd., Tokyo (JP)

( * ) Notice: Subject to any disclaimer, the term of this patent is extended or adjusted under 35 U.S.C. 154(b) by 312 days.

(21) Appl. No.: 18/614,197

(22) Filed: Mar. 22, 2024

(65) Prior Publication Data

US 2025/0296628 A1     Sep. 25, 2025

(51) Int. Cl.
B62D 21/15     (2006.01)
B62D 25/02     (2006.01)

(52) U.S. Cl.
CPC ......... B62D 21/157 (2013.01); B62D 25/025 (2013.01)

(58) Field of Classification Search
CPC .. B62D 21/157; B62D 25/025; B62D 21/151; B60R 2019/186
See application file for complete search history.

(56) References Cited

U.S. PATENT DOCUMENTS

| | | | | |
|---|---|---|---|---|
| 3,827,741 A | * | 8/1974 | Howell | ................... B60R 19/18 293/122 |
| 11,077,885 B2 | | 8/2021 | Koga et al. | |
| 11,091,016 B2 | | 8/2021 | Matsuda et al. | |
| 11,505,254 B2 | | 11/2022 | Boettcher et al. | |
| 11,597,447 B2 | | 3/2023 | Kim | |

| | | | | |
|---|---|---|---|---|
| 2002/0043821 A1 | * | 4/2002 | Takashina | ............ B62D 25/025 296/203.03 |
| 2006/0043743 A1 | * | 3/2006 | Shuler | ..................... B60R 19/12 293/120 |
| 2006/0261611 A1 | * | 11/2006 | Mohapatra | .............. B60R 19/18 293/107 |
| 2017/0080980 A1 | * | 3/2017 | Alwan | ..................... B60K 1/04 |
| 2022/0289298 A1 | | 9/2022 | Kuipers | |
| 2022/0289300 A1 | | 9/2022 | Kim et al. | |
| 2023/0011721 A1 | * | 1/2023 | Boettcher | ............ B62D 21/157 |
| 2023/0234644 A1 | * | 7/2023 | Limousin | ............ B62D 21/157 296/187.12 |

(Continued)

FOREIGN PATENT DOCUMENTS

| | | | | | |
|---|---|---|---|---|---|
| CN | 120156596 A | * | 6/2025 | ............. | B62D 21/02 |
| DE | 102011115040 A1 | * | 4/2012 | ........... | B62D 25/025 |

(Continued)

*Primary Examiner* — Patricia L Engle
(74) *Attorney, Agent, or Firm* — Morgan Lincoln; American Honda Motor Co., Inc.

(57)     ABSTRACT

A reinforcement assembly for a side sill includes a first reinforcement structure arranged inside a cavity of the side sill and including a plurality of first cones arrayed in a longitudinal direction of the vehicle. The reinforcement assembly also includes a second reinforcement structure coupled to the first reinforcement structure and includes a plurality of second cones arranged facing the first cones. Each second cone includes a tray shaped structure having a base and a wall extending in a lateral direction away from the first cone. The wall includes a top wall portion and a bottom wall portion. Further, each second cone includes a first leg extending in the lateral direction from an end of the wall towards the base and connected to the top wall portion, and a second leg connected to the bottom wall portion at a lateral offset from an end of the wall.

20 Claims, 21 Drawing Sheets

(56) References Cited

U.S. PATENT DOCUMENTS

| 2023/0373418 | A1 * | 11/2023 | Akif | ......................... B60R 19/18 |
| 2025/0206379 | A1 * | 6/2025 | Maeda | ................. B62D 25/025 |
| 2025/0296634 | A1 * | 9/2025 | Boettcher | ............ B62D 25/025 |
| 2025/0296635 | A1 * | 9/2025 | Boettcher | ............ B62D 21/157 |

FOREIGN PATENT DOCUMENTS

| WO | WO-2021071410 | A1 * | 4/2021 | ........... B62D 21/157 |
| WO | 2023277440 | A1 | 1/2023 | |
| WO | 2023089887 | A1 | 5/2023 | |
| WO | WO-2023085689 | A1 * | 5/2023 | ............... B60K 1/04 |
| WO | WO-2023090706 | A1 * | 5/2023 | ............. B62D 29/00 |

* cited by examiner

REINFORCEMENT ASSEMBLY FOR A SIDE SILL OF A VEHICLE

BACKGROUND

The disclosed subject matter relates generally to a side sill for a vehicle. More particularly, the disclosed subject matter relates to reinforcement assembly for a side sill of a vehicle.

Side sills with energy absorption features are currently used to protect vehicle occupants from side impacts. There is a further need to protect a vehicle battery positioned at a vehicle underbody from side impacts.

SUMMARY

In accordance with one embodiment of the present disclosure, a reinforcement assembly for a side sill of a vehicle is provided. The reinforcement assembly comprises a first reinforcement structure adapted to be arranged inside a cavity of the side sill and including a plurality of first cones arrayed adapted to be arrayed in a longitudinal direction of the vehicle. The reinforcement assembly also includes a second reinforcement structure coupled to the first reinforcement structure and arranged inside the cavity. The second reinforcement structure includes a plurality of second cones adapted to be arrayed in the longitudinal direction of the vehicle and arranged facing the plurality of first cones. Each second cone includes a tray shaped structure having a base arranged proximate to the first cone and a wall extending in a lateral direction away from the first cone. The wall includes a top wall portion and a bottom wall portion. Further, each second cone includes a first leg extending in the lateral direction from an end of the wall towards the base and connected to the top wall portion, and a second leg connected to the bottom wall portion at a lateral offset from an end of the wall. The second leg extends in the lateral direction from the bottom wall portion towards the base.

In accordance with another embodiment of the present disclosure, a side sill for a vehicle is provided. The side sill comprises a first plate and a second plate arranged contacting the first plate and defining a cavity therebetween. The side sill also includes a first reinforcement structure arranged inside the cavity of the side sill and including a plurality of first cones adapted to be arrayed in the longitudinal direction of the vehicle. The side sill also includes a second reinforcement structure coupled to the first reinforcement structure and arranged inside the cavity, The second reinforcement structure includes a plurality of second cones configured to be arrayed in the longitudinal direction of the vehicle and arranged facing the plurality of first cones. Each second cone includes a tray shaped structure having a base arranged proximate to the first cone and a wall extending in a lateral direction away from the first cone. The wall includes a top wall portion and a bottom wall portion. Further, each second cone includes a first leg extending in the lateral direction from an end of the wall towards the base and connected to the top wall portion, and a second leg connected to the bottom wall portion at a lateral offset from an end of the wall. The second leg extends in the lateral direction from the bottom wall portion towards the base.

In accordance with yet a further embodiment of the present disclosure a vehicle is provided. The vehicle comprises a vehicle body including a frame, and a side sill coupled to the frame. The side sill includes a first plate and a second plate arranged contacting the first plate and defining a cavity therebetween. The side sill also includes a first reinforcement structure arranged inside the cavity of the side sill and including a plurality of first cones arrayed in a longitudinal direction of the vehicle. Moreover, the side sill includes a second reinforcement structure coupled to the first reinforcement structure and arranged inside the cavity. The second reinforcement structure includes a plurality of second cones arrayed in the longitudinal direction of the vehicle and arranged facing the plurality of first cones. Each second cone includes a tray shaped structure having a base arranged proximate to the first cone and a wall extending in a lateral direction away from the first cone. The wall includes a top wall portion and a bottom wall portion. Each second cone also includes a first leg extending in the lateral direction from an end of the wall towards the base and connected to the top wall portion, and a second leg connected to the bottom wall portion at a lateral offset from an end of the wall. The second leg extends in the lateral direction from the bottom wall portion towards the base. The first leg and the second leg are arranged to transfer an impact load to the frame.

BRIEF DESCRIPTION OF THE DRAWINGS

Certain embodiments of the present disclosure will be better understood from the following description taken in conjunction with the accompanying drawings in which.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows. Embodiments are hereinafter described in detail in connection with the views and examples of FIGS. 1-21, wherein like numbers indicate the same or corresponding elements throughout the views.

Figure 1:
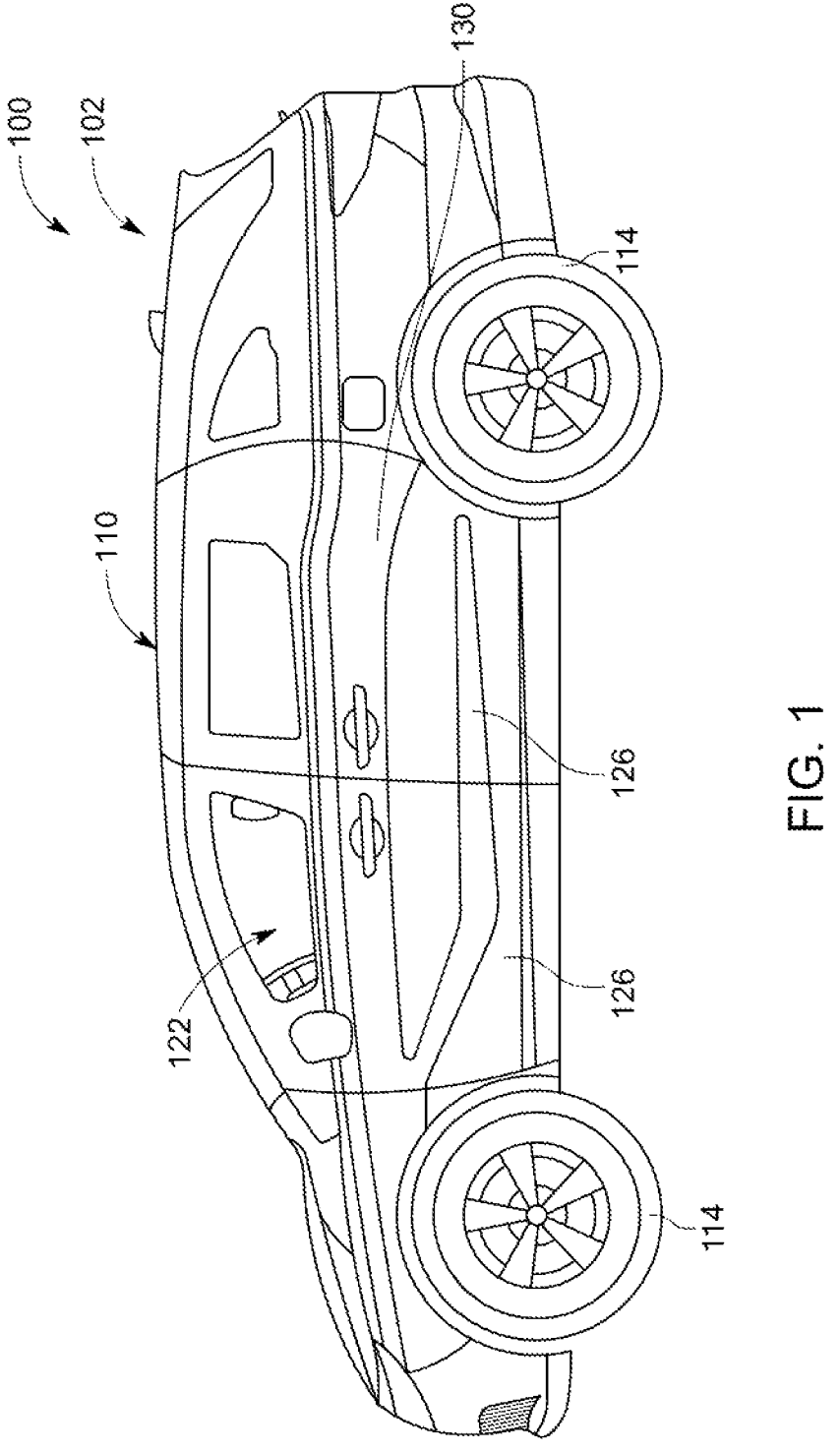
FIG. 1 is a side view depicting a vehicle, in accordance with one embodiment of the present disclosure.

FIG. 1 illustrates a side view of a vehicle, indicated generally at 100, in accordance with one embodiment of the present disclosure. The vehicle 100 is shown as a van 102. However, vehicle 100 in accordance with alternative embodiments can comprise any variety of vehicles, including sedans, trucks, recreational vehicles, utility vehicles, agricultural equipment, or construction equipment, for example. In an embodiment, the vehicle 100 is an electric vehicle having at least one battery 106 (shown in FIG. 2) to power the vehicle 100.

Figure 2:
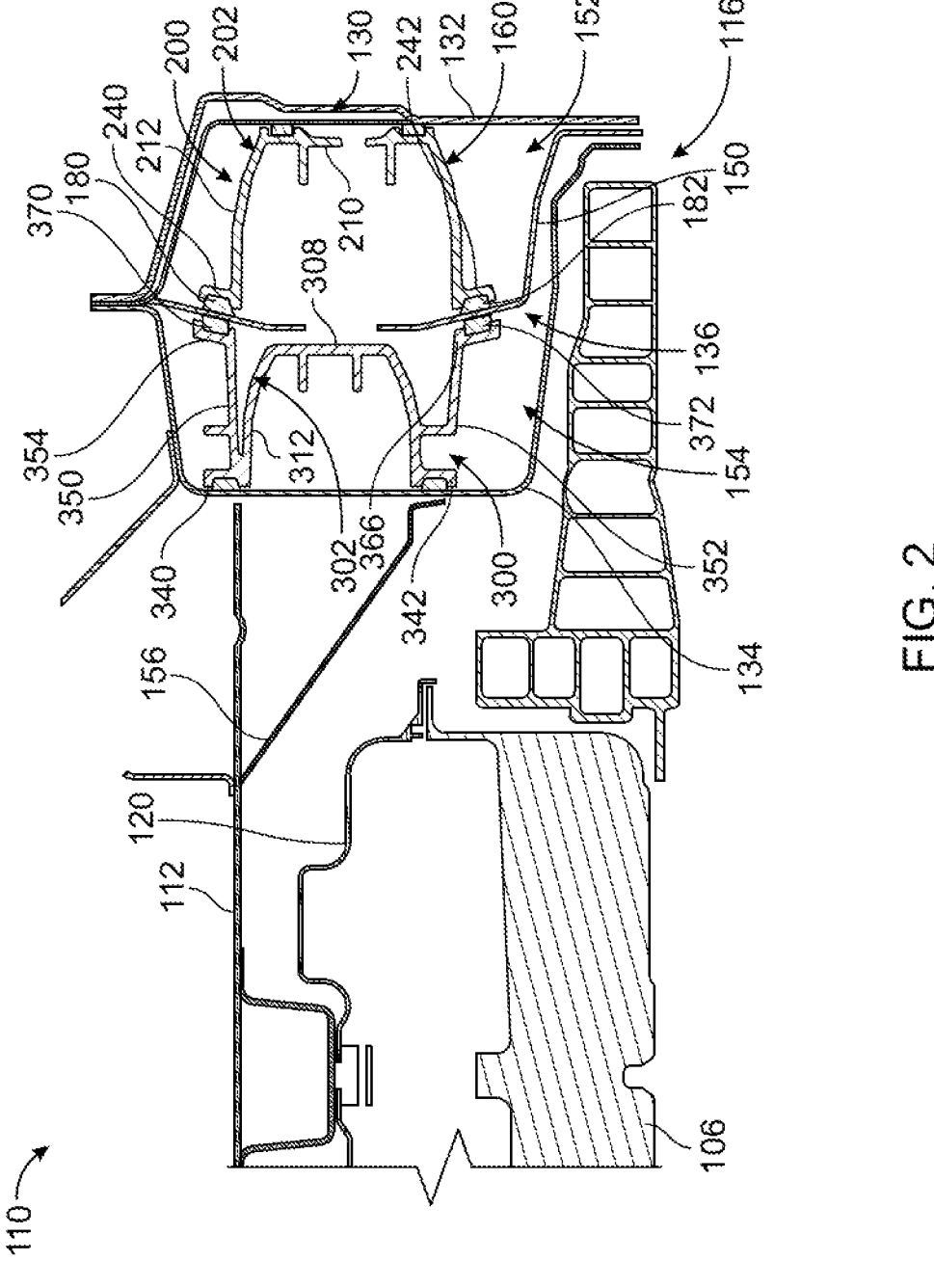
FIG. 2 is a sectional view of the vehicle depicting a side sill of the vehicle having a reinforcement assembly, in accordance with one embodiment of the present disclosure.

As shown in FIG. 2, the vehicle 100 includes a vehicle body 110 including a frame 112 to which various components of the vehicle 100 is mounted, and a plurality of traction members 114, for example, wheels 114, movably supporting the vehicle body 110 on a surface. Also, the vehicle body 110 defines an underbody structure 116 defining a battery compartment 120 to store the at least one battery 106. Moreover, referring again to FIG. 1, the vehicle body 110 defines a passenger compartment 122 and a plurality of access openings, for example, two side front access openings and two side rear access openings, to enable an entry and exit of the passenger from the passenger compartment 122. Additionally, the vehicle 100 includes a plurality of side doors 126 movably attached to the vehicle body 110 for selectively closing the plurality of access openings. The vehicle body 110 includes a side sill 130 arranged proximate to a floor of the vehicle body 110. It may be appreciated that a lower end portion of the side doors 126 contact and abut the side sills 130 of the vehicle 100 when arranged in closed position.

As shown in FIG. 2, the side sill 130 includes a first plate 132, i.e. outer plate 132 arranged to contact the side doors 126 and a second plate 134 i.e., inner plate 134 arranged in contact with the outer plate 132 and defining a cavity 136 therebetween. As shown, the inner plate 134 includes horizontally oriented U-shape while the outer plate 132 includes a horizontally oriented L-shape connected to legs of the inner plate 134. Further, the side sill 130 includes a panel 150 arranged extending between the outer plate 132 and the inner plate 134, separating the cavity 136 into a first chamber 152 i.e., outer chamber 152 and a second chamber 154 i.e., inner chamber 154.

As shown, the outer chamber 152 is defined between outer plate 132 and the panel 150, while the inner chamber 154 is defined between the inner plate 134 and the panel 150. It may be appreciated that the panel 150 may be made of any suitable material, for example, metal, alloy, resin, or any other suitable material known in the art. Further, the vehicle body 110 includes a connecting member 156 extending vertically upwardly and obliquely from a location proximate to the battery compartment 120 and the inner plate 134 to the frame 112 to enable a load transfer from the inner plate 134 to the frame 112 and restricts a transfer of impact load to the battery compartment 120 from the side sill 130.

Figure 3:
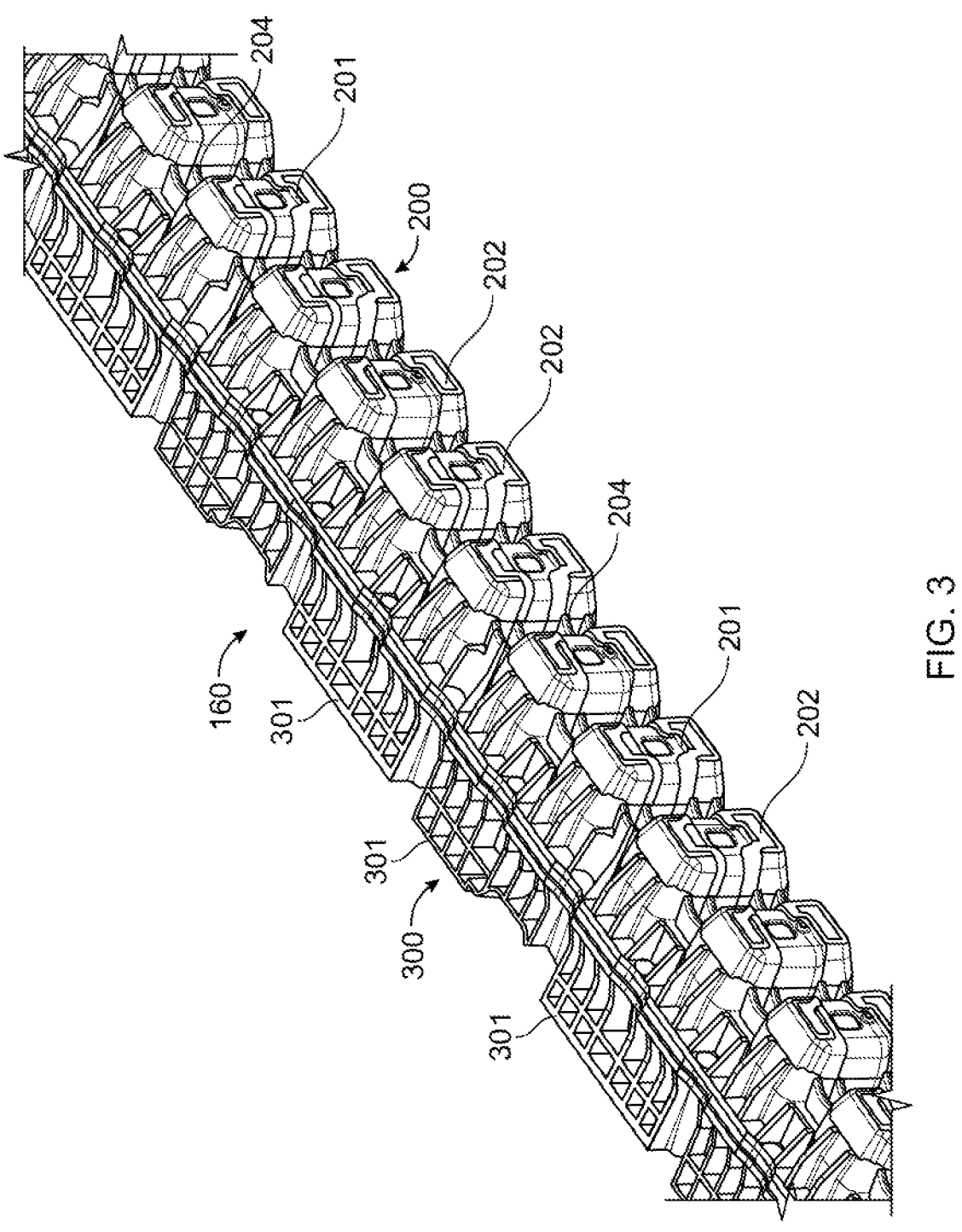
FIG. 3 is a top perspective view of the reinforcement assembly of FIG. 2, in accordance with one embodiment of the present disclosure.

Further, the side sill 130 includes a reinforcement assembly 160 configured to absorb impact and direct/transfer load in a desired direction to the frame 112 of the vehicle body 110. As shown in FIGS. 2 and 3, the reinforcement assembly 160 includes a first reinforcement structure 200 i.e., outer reinforcement structure 200, arranged inside the outer chamber 152 and extending in a longitudinal direction of the vehicle 100, and a second reinforcement structure 300 i.e., inner reinforcement structure 300 arranged inside the inner chamber 154 and engaged with the panel 150. In the embodiment, each of the outer reinforcement structure 200 and the inner reinforcement structure 300 is made of resin based material. In some embodiments, the outer reinforcement structure 200 and the inner reinforcement structure 300 are made of fiber reinforced resin or fiber reinforced thermoplastic. The resin based outer and inner reinforcement structures 200, 300 provide large impact energy absorbing capacity.

Figure 4:
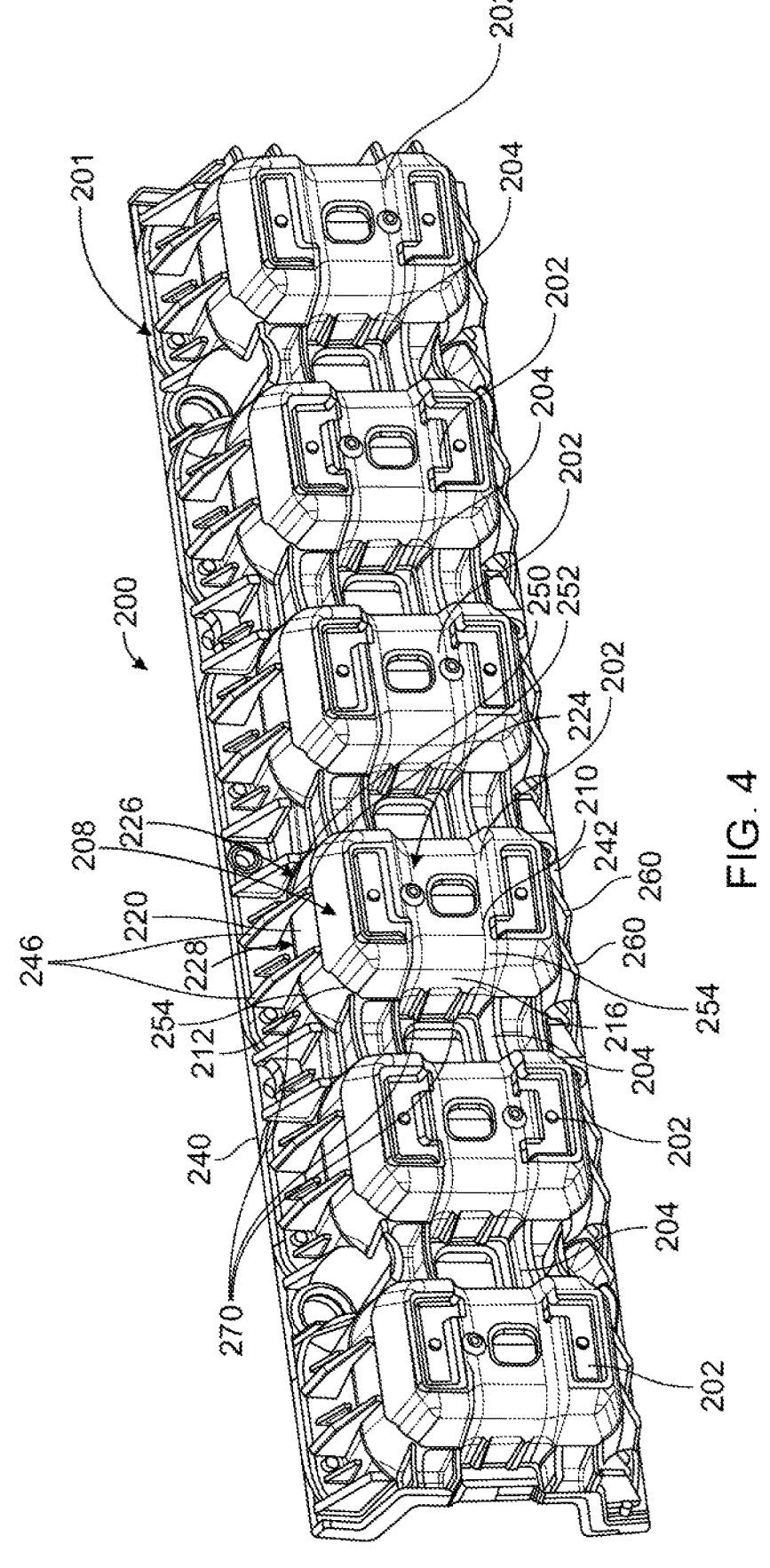
FIG. 4 is a top perspective view of an outer reinforcement structure of the reinforcement assembly of FIG. 3, in accordance with one embodiment of the present disclosure.
Figure 5:
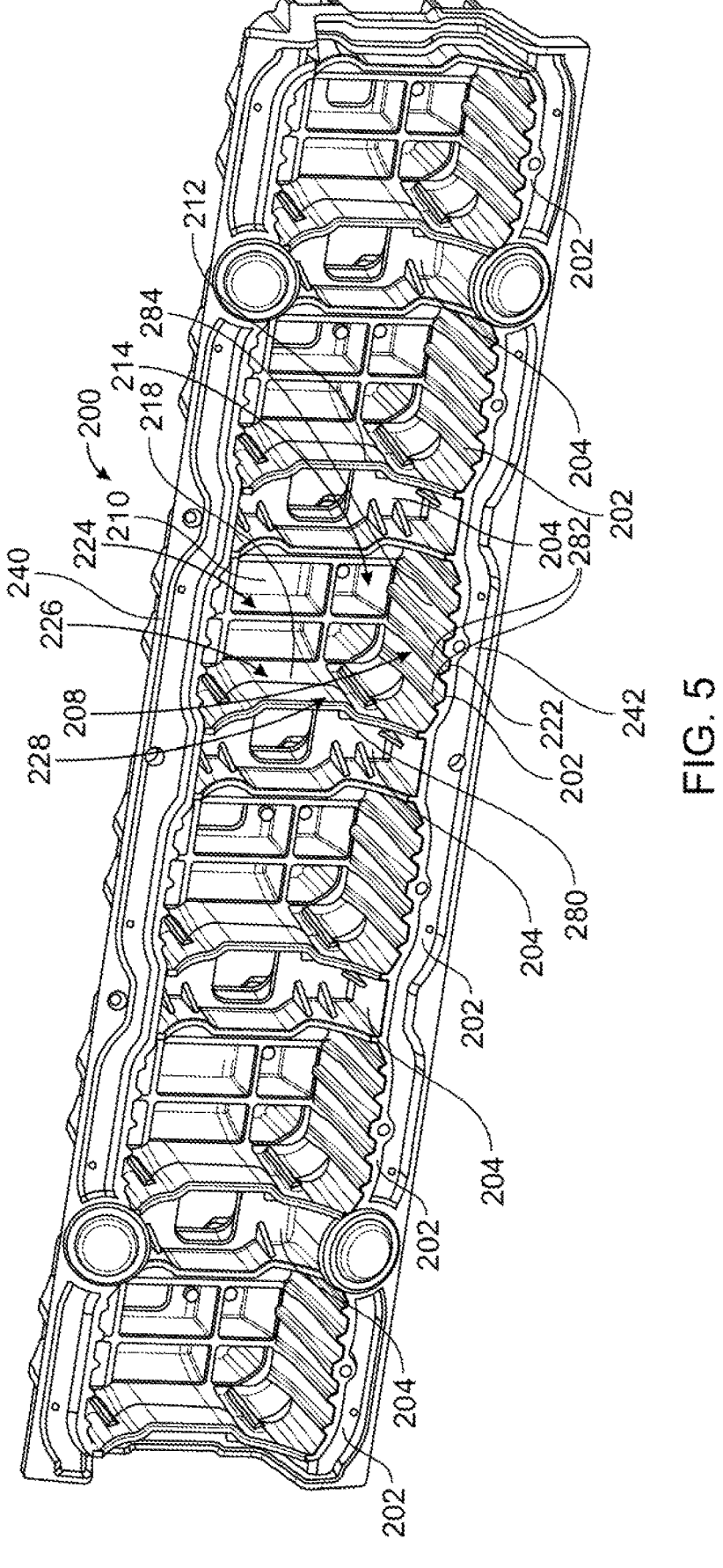
FIG. 5 is another top perspective view of the outer reinforcement structure of FIG. 4 depicting interior of the outer reinforcement structure, in accordance with one embodiment of the present disclosure.

Referring to FIGS. 4 and 5, the outer reinforcement structure 200 includes a plurality of first segments 201 (shown in FIG. 3) with each first segment 201 having a plurality of first cones 202 arrayed linearly in the longitudinal direction of the vehicle 100 and interconnected with each other via a plurality of first bridges 204. Accordingly, two adjacent first cones 202 are interconnected via a single first bridge 204 arranged between the two adjacent first cones 202. As the outer reinforcement structure 200 includes a plurality of first segments 201 engaged with each other and arrayed in the longitudinal direction of the vehicle 100, the first segments 201 facilitate an isolation of an impact load/ energy from one another. It may be appreciated that plurality of first cones 202 is identical in structure and function, therefore, for sake of clarity and brevity, the structure and function are described with reference to a single first cone 202.

Figure 6:
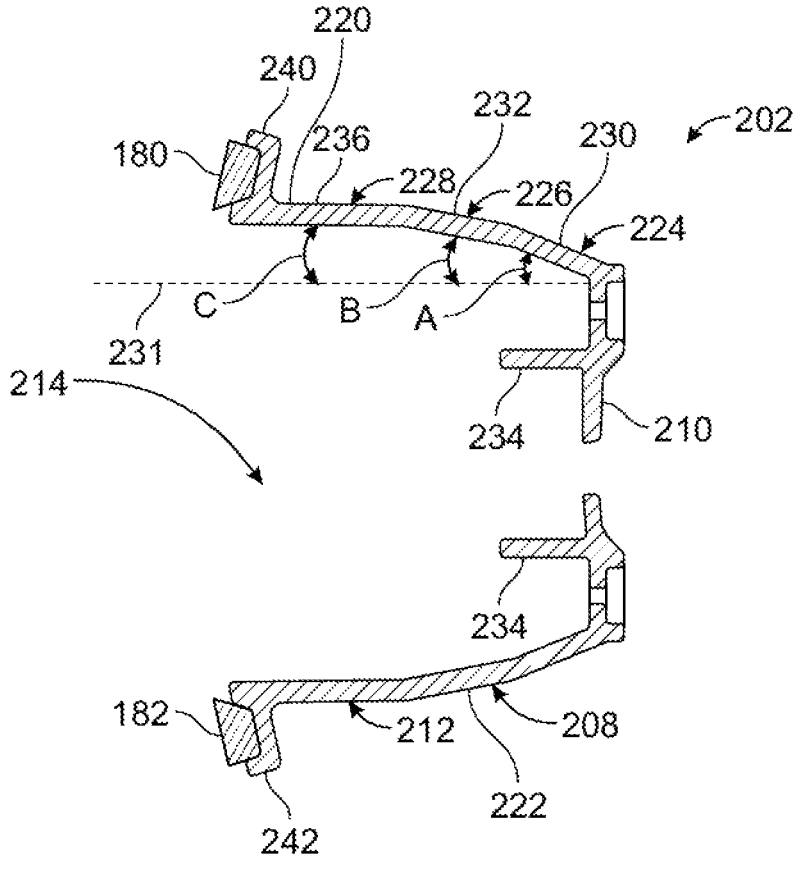
FIG. 6 is sectional view of the outer reinforcement structure of FIG. 4, in accordance with one embodiment of the present disclosure.
Figure 7:
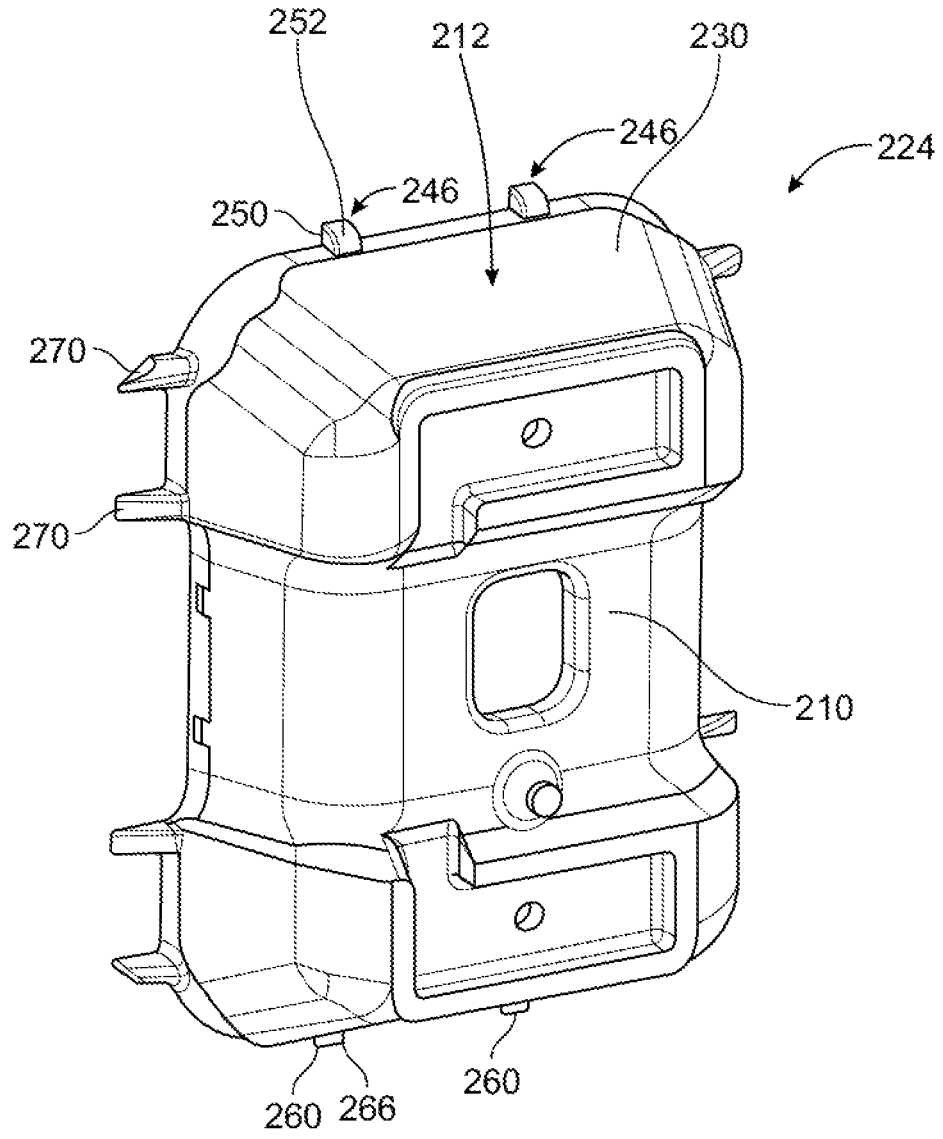
FIG. 7 is a top perspective view of a first portion of the outer reinforcement structure of FIG. 4, in accordance with one embodiment of the present disclosure.
Figure 8:
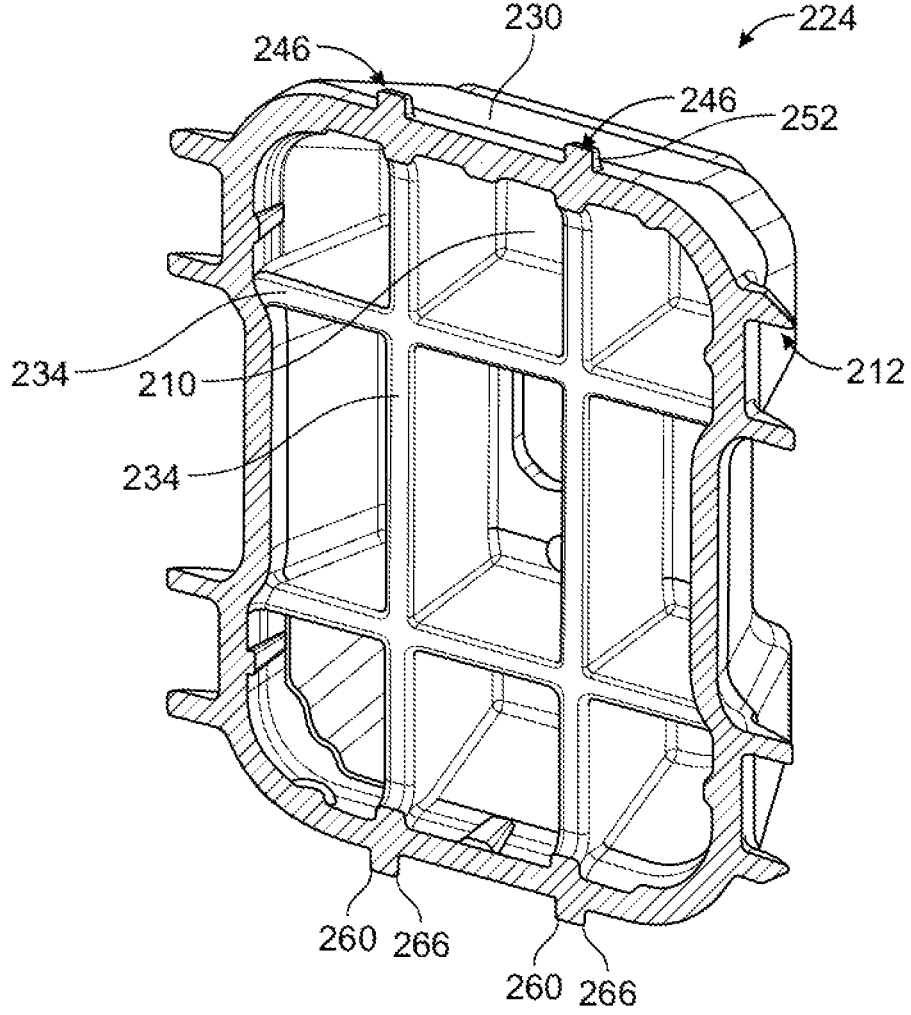
FIG. 8 is a top perspective view of a first portion of the outer reinforcement structure of FIG. 5, in accordance with one embodiment of the present disclosure.
Figure 9:
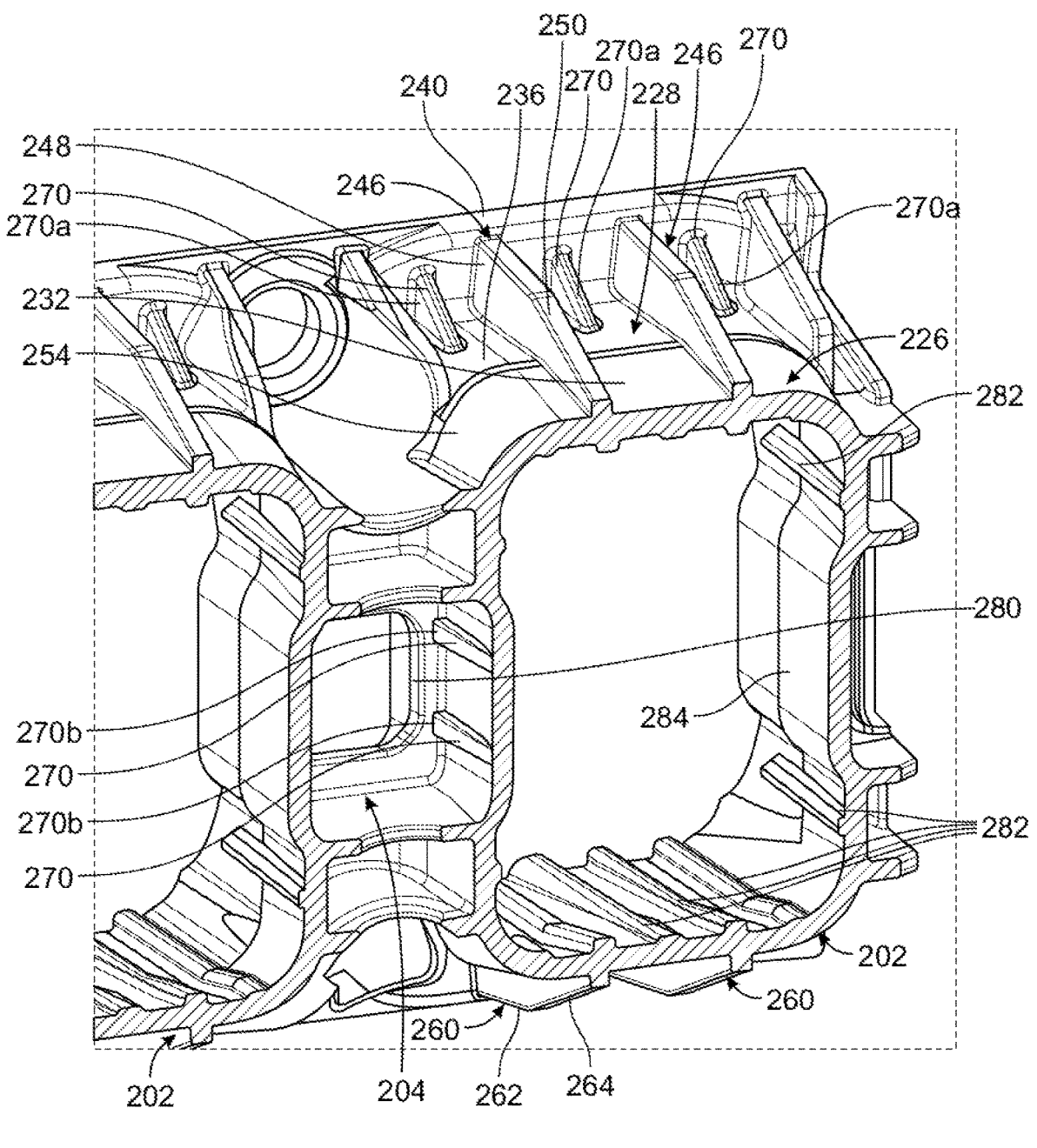
FIG. 9 is a top perspective view of the outer reinforcement structure with the first portion removed, in accordance with one embodiment of the present disclosure.
Figure 10:
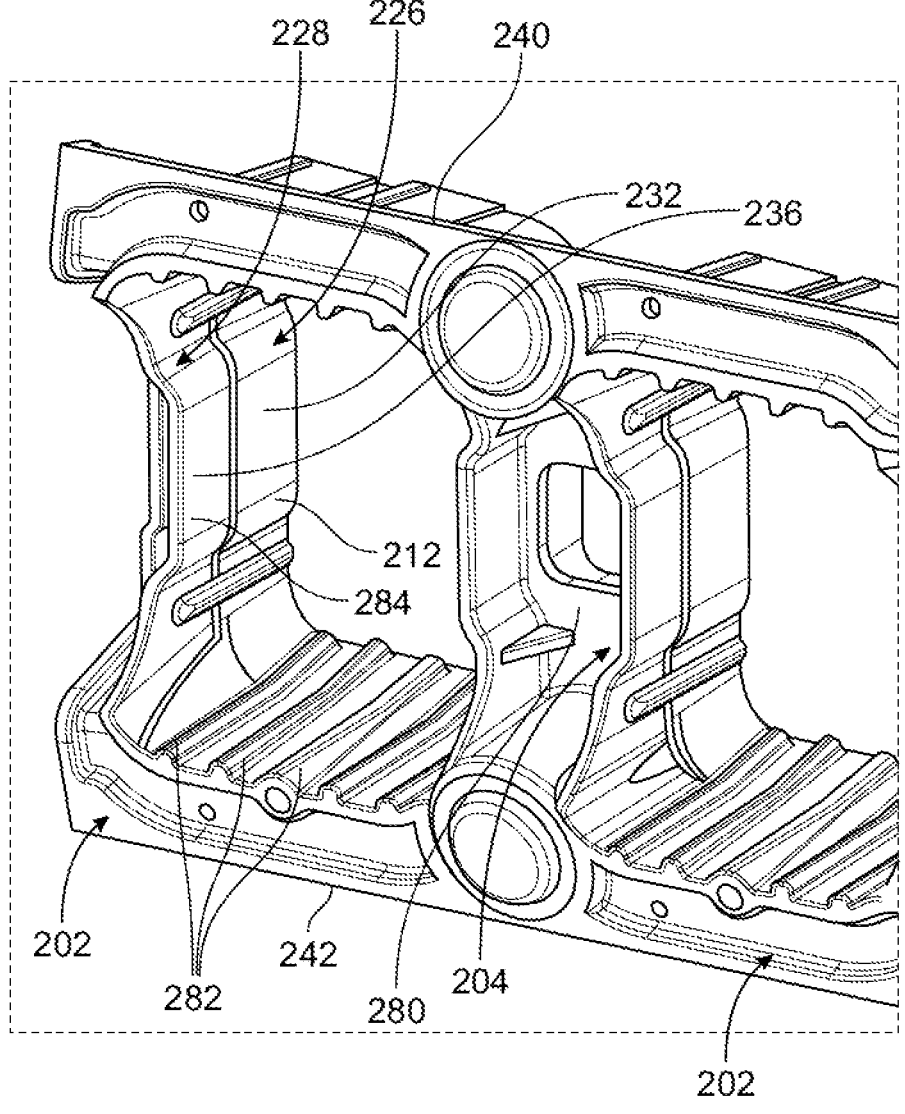
FIG. 10 is another top perspective view of the outer reinforcement structure with the first portion removed, in accordance with one embodiment of the present disclosure.
Figure 11:
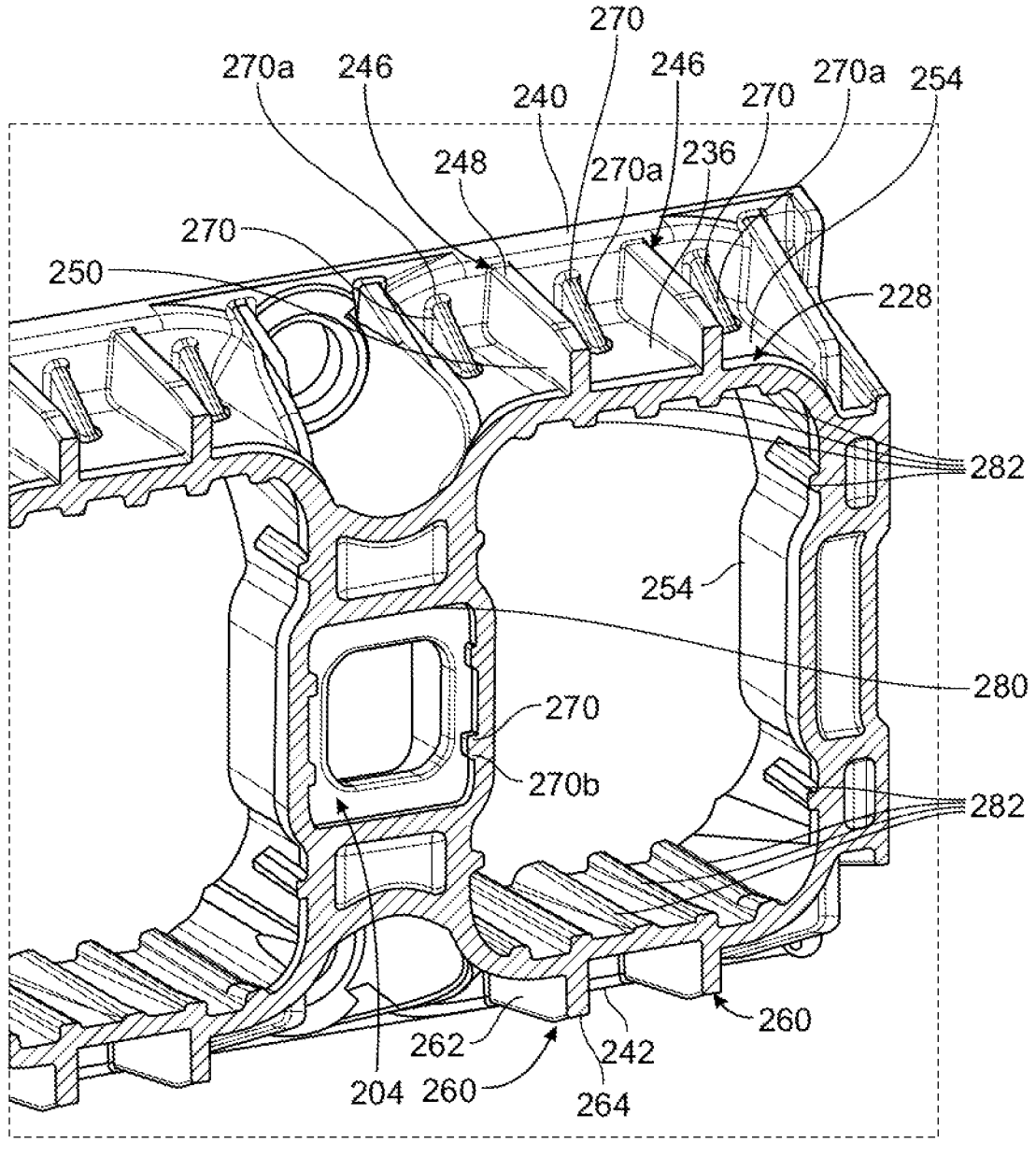
FIG. 11 is a top perspective view of a third portion of the outer reinforcement structure, in accordance with one embodiment of the present disclosure.
Figure 12:
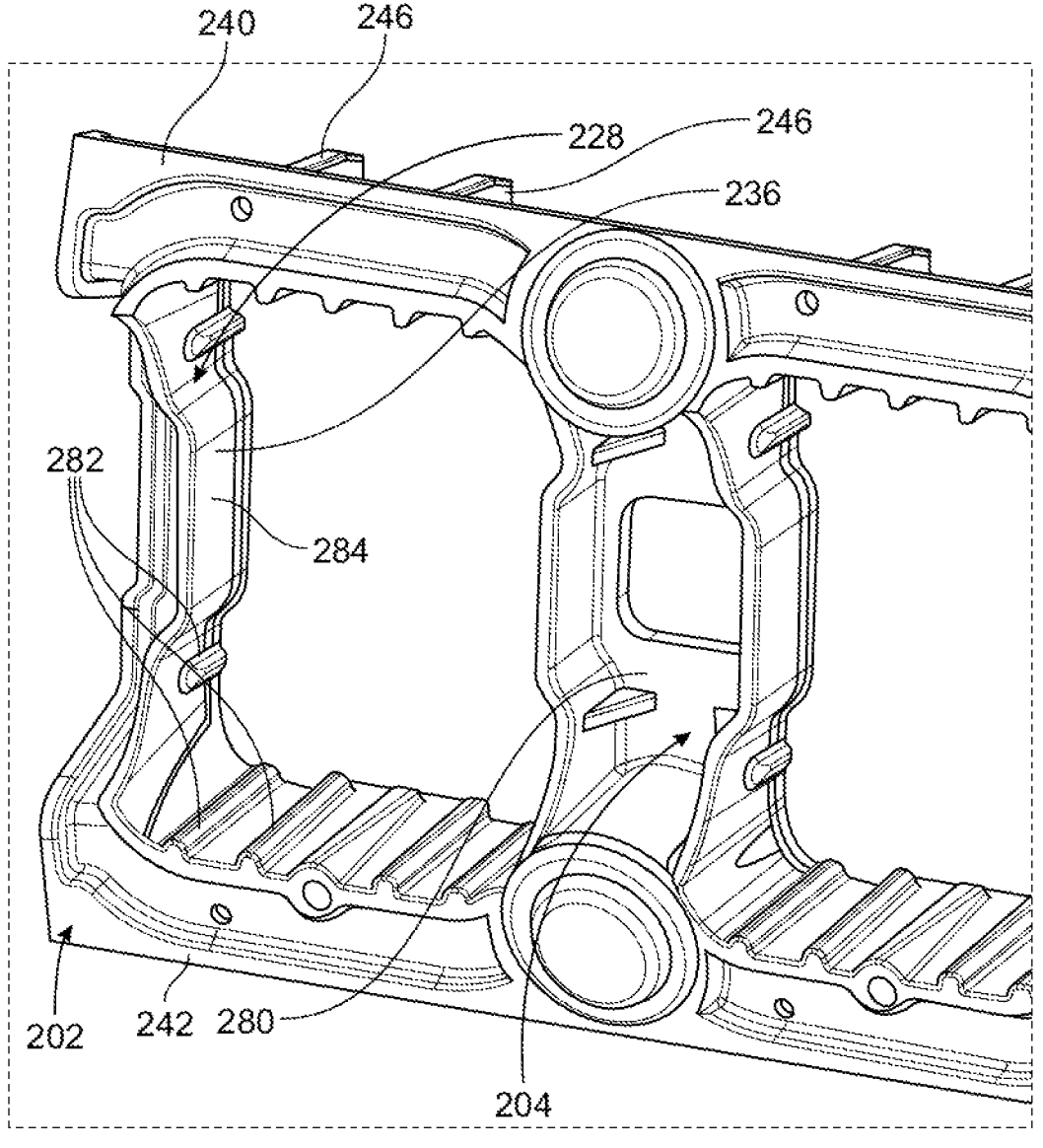
FIG. 12 is another top perspective view of the third portion of the outer reinforcement structure, in accordance with one embodiment of the present disclosure.
Figure 13:
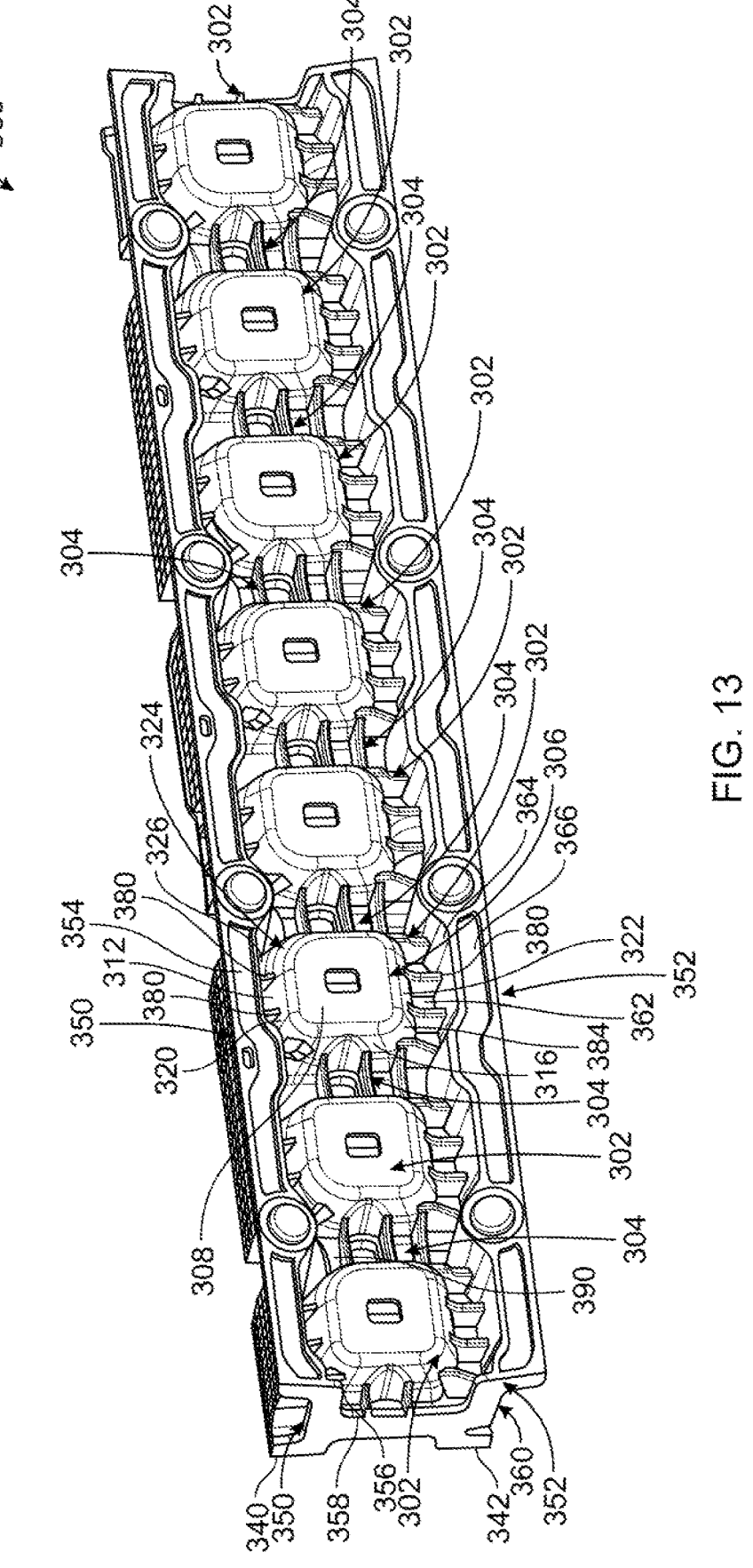
FIG. 13 is a top perspective view of an inner reinforcement structure of the reinforcement assembly of FIG. 3, in accordance with one embodiment of the present disclosure.
Figure 14:
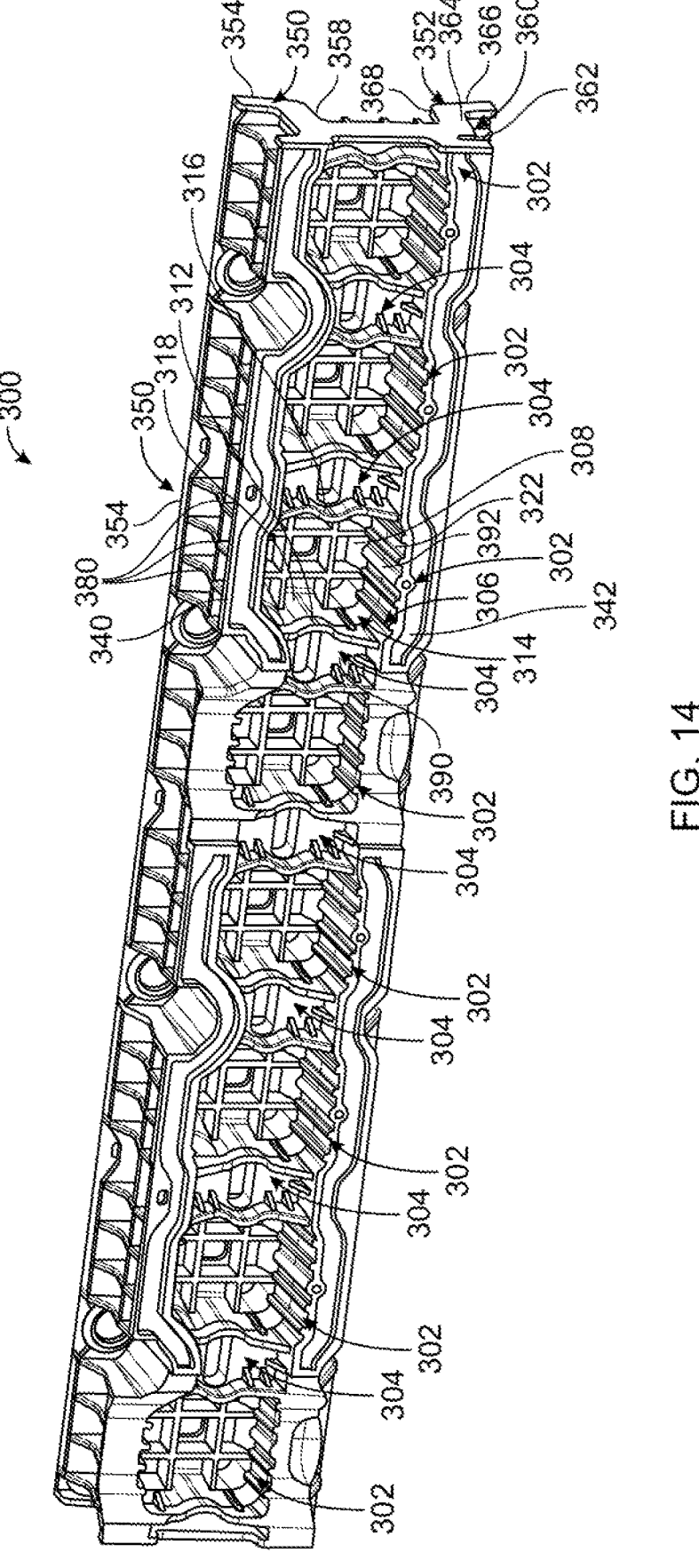
FIG. 14 is another top perspective view of the inner reinforcement structure of FIG. 13 depicting interior of the inner reinforcement structure, in accordance with one embodiment of the present disclosure.

Referring to FIGS. 4-6, the first cone 202 (also referred to as outer cone 202) includes a tray shaped structure 208 having a vertically arranged base 210 and a wall 212 extending in a lateral direction from an entire outer edge of the base 210 and defining/enclosing a space 214 therebetween. As shown, the wall defines a pair of sidewall portions 216, 218 extending in a vertical direction and arranged spaced apart and facing each other, a top wall portion 220 extending horizontally in the longitudinal direction, and a bottom wall portion 222 arranged vertically below the top wall portion 220. The sidewall portions 216, 218 connects the top wall portion 220 and the bottom wall portion 222. Also, the outer cone 202 i.e., tray shaped structure 208 includes three portions or zones, for example, a first portion 224, a second portion 226, and a third portion 228 extending in the lateral direction. Accordingly, the tray shaped structure 208 includes three separate fracture zones.

The first portion 224 i.e., outer portion 224 (best shown in FIGS. 7 and 8) includes the base 210 and a first wall structure 230 of the wall 212 that extends in the lateral direction from the base 210, the second portion 226 i.e., intermediate portion 226 (best shown in FIGS. 9 and 10) includes a second wall structure 232 of the wall 212 extending in the lateral direction from the first portion 224, and the third portion 228 (best shown in FIGS. 11 and 12) i.e., inner portion 228 includes a third wall structure 236 of the wall 212 extending in the lateral direction from the second portion 226 to an edge of the wall 212. Also, the first portion 224 inside a grid of ribs 234 (best shown in FIG. 8) arranged inside the space 214 to provide additional reinforcement or impact energy absorbing capacity.

As shown in FIG. 6, the first wall structure 230 extends at a first angle 'A' relative to a horizontal axis 231, the second wall structure 232 extends at a second angle 'B' relative to the horizontal axis 231, and the third wall structure 236 extends at a third angle 'C' relative to the horizontal axis 231 extending in the lateral direction and arranged substantially perpendicularly to the base 210. Accordingly, the second wall structure 232 is arranged at an inclination relative to the first wall structure 230 and the third wall structure 236 is disposed at an inclination relative to the second wall structure 232. In the illustrated embodiment, the first angle 'A' is different from the second angle 'B', while the third angle 'C' is different from the second angle 'B'. In some embodiments, the first angle 'A' is different from both the second angle 'B' and the third angle 'C'.

Moreover, as shown in FIGS. 4-6, and 9-12, each outer cone 202 includes a first flange 240 extending substantially perpendicularly i.e., vertically upwardly from the edge of the top wall portion 220 and a second flange 242 extending vertically downwardly from the edge of the bottom wall portion 222. Moreover, each outer cone 202 includes a plurality of first primary ribs 246 extending from the first flange 240 to a junction of the first portion 224 to the second portion 226 in the lateral direction. As shown, each first primary rib 246 include a straight portion 248 extending from the first flange 240 to a location inwardly of a junction of the third portion 228 with the second portion 226, and an inclined portion 250 extending obliquely from the straight portion 248 to a free end 252 of the first primary rib 246. As shown, the free end 252 of the first primary rib 246 is arranged outwardly of the junction of the second portion 226 and the first portion 224 and contacts the first wall structure 230. Accordingly, a height of the first primary rib 246 decreases from the straight portion 248 to the free end 252 of the first primary rib 246. Also, the first primary ribs 246 are arrayed in the longitudinal direction. It may be appreciated that the first primary ribs are outer ribs extending outwardly from an outer surface 254 of the wall 212.

Similar to the first primary ribs 246, the outer cone 202 includes a plurality of second primary ribs 260 extending from the second flange 242 to a junction of the first portion

224 to the second portion 226. As shown, each second primary rib 260 includes a straight portion 262 extending, in the lateral direction, from the second flange 242 to a location inwardly of a junction of the third portion 228 with the second portion 226, and an inclined portion 264 extending obliquely from the straight portion 262 to a free end 266 of the second primary rib 260. The inclined portion 264 and hence the free end 266 contact the first wall structure 230 of the first portion 224. Accordingly, a height of the second primary rib 260 decreases from the straight portion 262 to the free end 266 of the second primary rib 260. Also, the second primary ribs 260 are arrayed in the longitudinal direction along the second flange 242. It may be appreciated that the second primary ribs 260 are outer ribs extending outwardly from the outer surface 254 of the wall 212.

Moreover, the outer cone 202 includes a plurality of secondary ribs 270 arrayed along an outer periphery of the third portion 228 and connected to the outer surface of the third portion 228. As shown a first set of secondary ribs 270a is connected to the first flange 240, a second set of the secondary ribs (not shown) is connected to the second flange 242, while a third set of the secondary ribs 270b is connected to the first bridges 204 extending on longitudinal sides of the outer cone 202. The primary ribs 246, 260 and the secondary ribs 270 and associated structures provide for differential energy absorbing capacity for each of the zones 224, 226, 228. It may be appreciated that under the crush load or impact load, the first portion or zone 224 separates from the second portion or zone 226 along the junction absorbing some of the impact energy. Thereafter, depending on the impact load, the second portion or zone 226 separates from the third portion 228 when the impact load exceeds a second threshold value. It may be appreciated that due to the primary ribs 246, 260 and the secondary ribs 270 and shear walls 280 of the first bridges 204, the third portion 228 provides a larger impact energy absorbing capacity. Additionally, to increase the impact absorbing capacity of the outer reinforcement structure 200, each outer cone 202 includes inner ribs 282 arranged inside the space 214 and protruding from an inner surface 284 of the wall 212.

Referring to FIGS. 3 and 13-15, the inner reinforcement structure 300 includes a plurality of second segments 301 (best shown in FIG. 3) with each second segment 301 having a plurality of second cones 302 arrayed linearly in the longitudinal direction of the vehicle 100 and interconnected with each other via a plurality of second bridges 304. Accordingly, two adjacent second cones 302 are interconnected via a single second bridge 304 arranged between the two adjacent second cones 302. As the inner reinforcement structure 300 includes the plurality of second segments 301 engaged with each other and arrayed in the longitudinal direction of the vehicle 100, the second segments 301 facilitate an isolation of an impact load/energy from one another. It may be appreciated that the plurality of second cones 302 is identical in structure and function, therefore, for sake of clarity and brevity, the structure and function are described with reference to a single second cone 302.

The second cone 302 (also referred to as inner cone 302) includes a tray shaped structure 306 having a vertically arranged base 308 disposed proximate to the outer cone 202 and a wall 312 extending in the lateral direction from the base 308 and away from the outer cone 202 and defining a pocket 314 therebetween. As shown, the wall 312 defines a pair of sidewall portions 316, 318 extending in a vertical direction and arranged spaced apart and facing each other, a top wall portion 320 extending horizontally in the longitudinal direction, and a bottom wall portion 322 arranged vertically below the top wall portion 320. The sidewall portions 316, 318 connects the top wall portion 320 and the bottom wall portion 322. Moreover, the inner cone 302 i.e., tray shaped structure 306 includes three portions or zones, for example, a first portion 324, a second portion 326, and a third portion 328, extending in the lateral direction.

The first portion 324 i.e., outer portion 324 (best shown in FIGS. 16 and 17) includes the base 308 and a first wall structure 330 of the wall 312 extending from the base 308 to the second portion 326, the second portion 326 i.e., inter-mediate portion 326 (best shown in FIGS. 18 and 19) includes a second wall structure 332 of the wall 312 extend-ing in the lateral direction from the first portion 324, and the third portion 328 i.e., inner portion 328 (best shown in FIGS. 20 and 21) includes a third wall structure 336 of the wall 312 that extends in the lateral direction from the intermediate portion 326 to an edge of the wall 312. Also, the first portion 324 inside a grid of ribs 334 arranged inside the pocket 314 to provide additional reinforcement or impact energy absorbing capacity.

Figure 15:
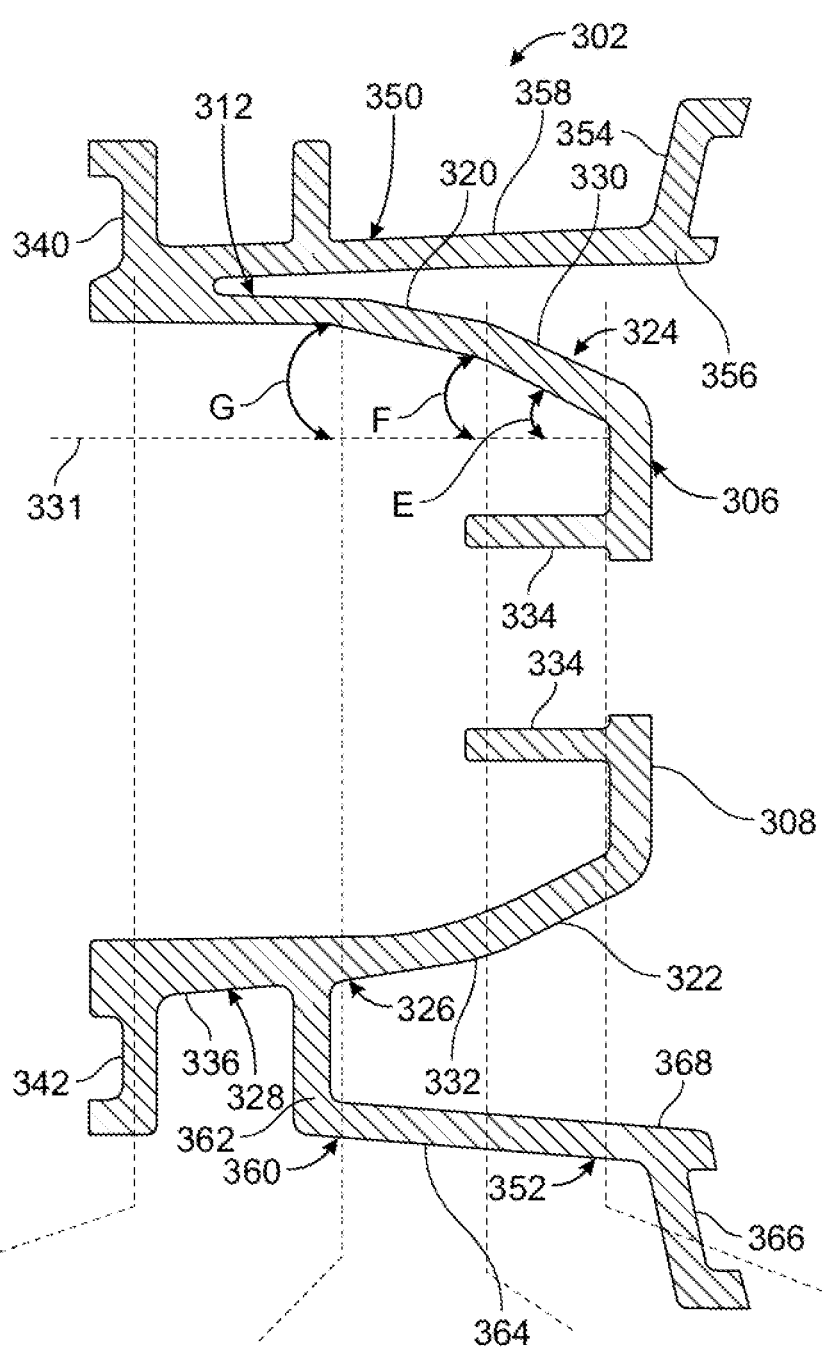
FIG. 15 is sectional view of the inner reinforcement structure of FIG. 13, in accordance with one embodiment of the present disclosure.
Figure 16:
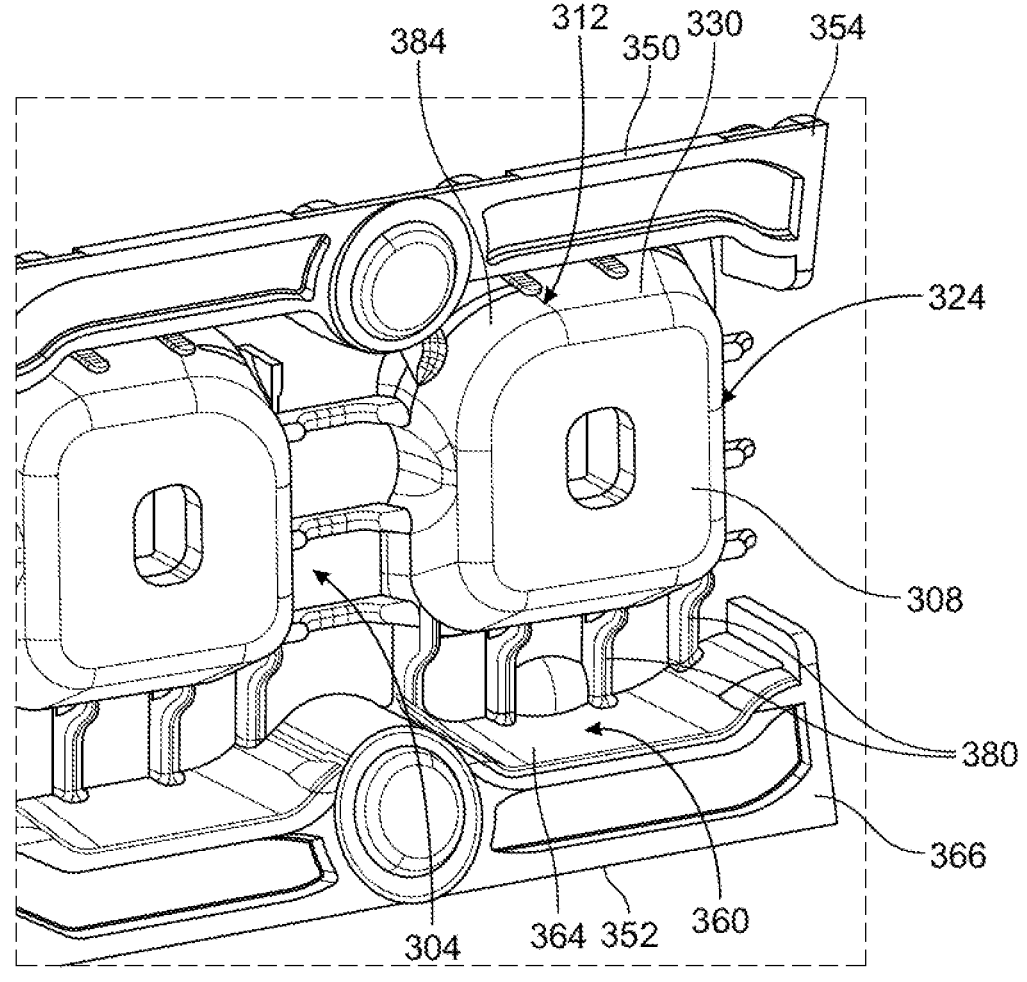
FIG. 16 is a top perspective view of a first portion of the inner reinforcement structure of FIG. 13, in accordance with one embodiment of the present disclosure.
Figure 17:
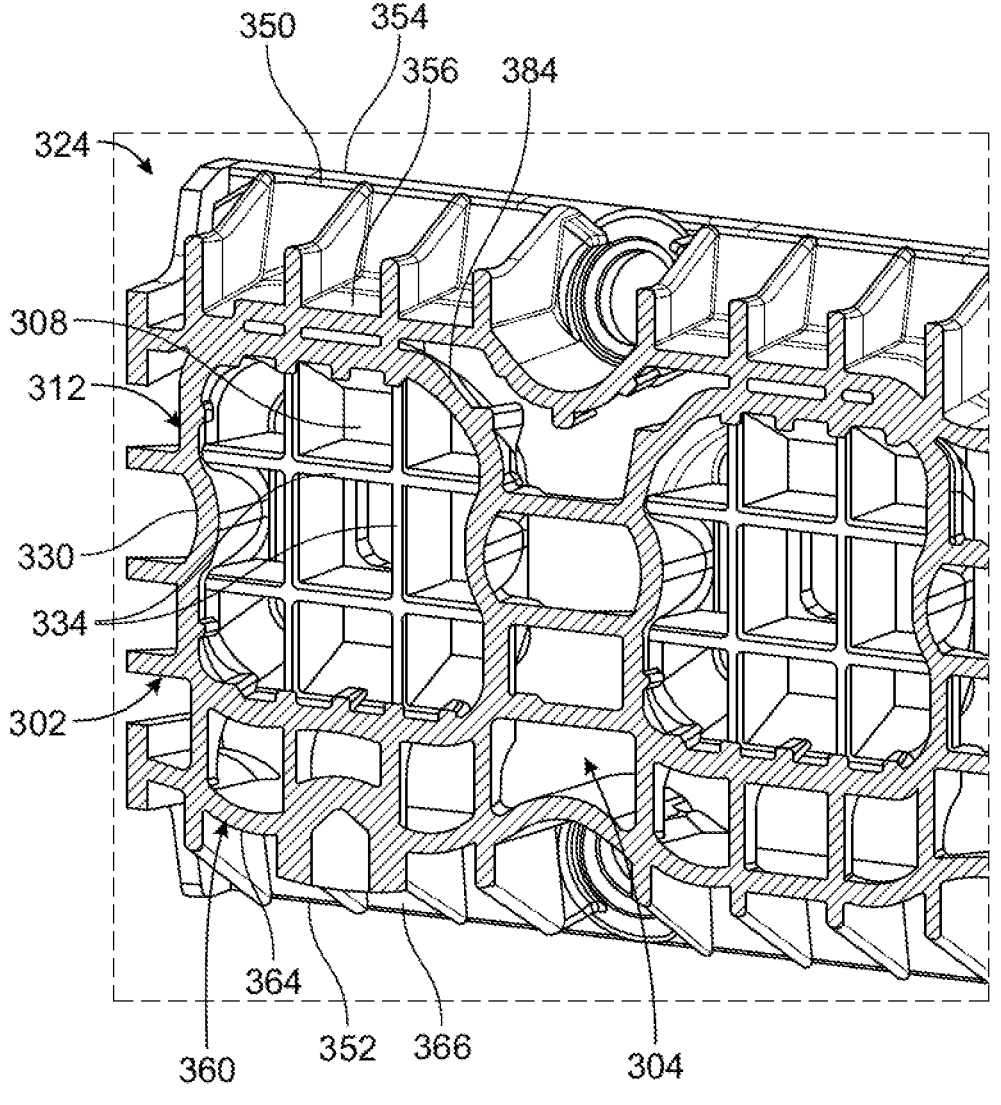
FIG. 17 is a top perspective view of the first portion of the inner reinforcement structure of FIG. 14, in accordance with one embodiment of the present disclosure.
Figure 18:
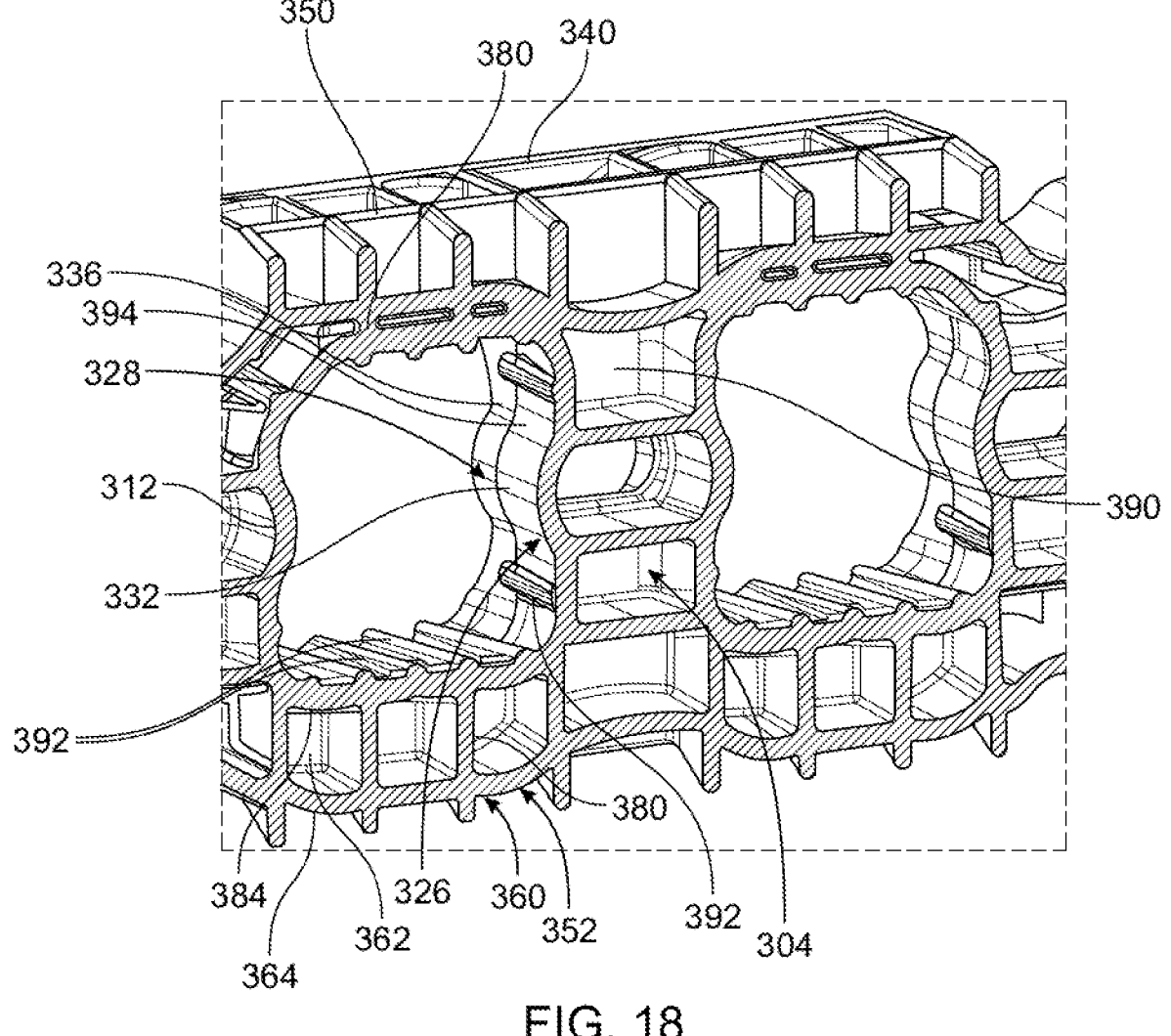
FIG. 18 is a top perspective view of the inner reinforcement structure with the first portion removed, in accordance with one embodiment of the present disclosure.
Figure 19:
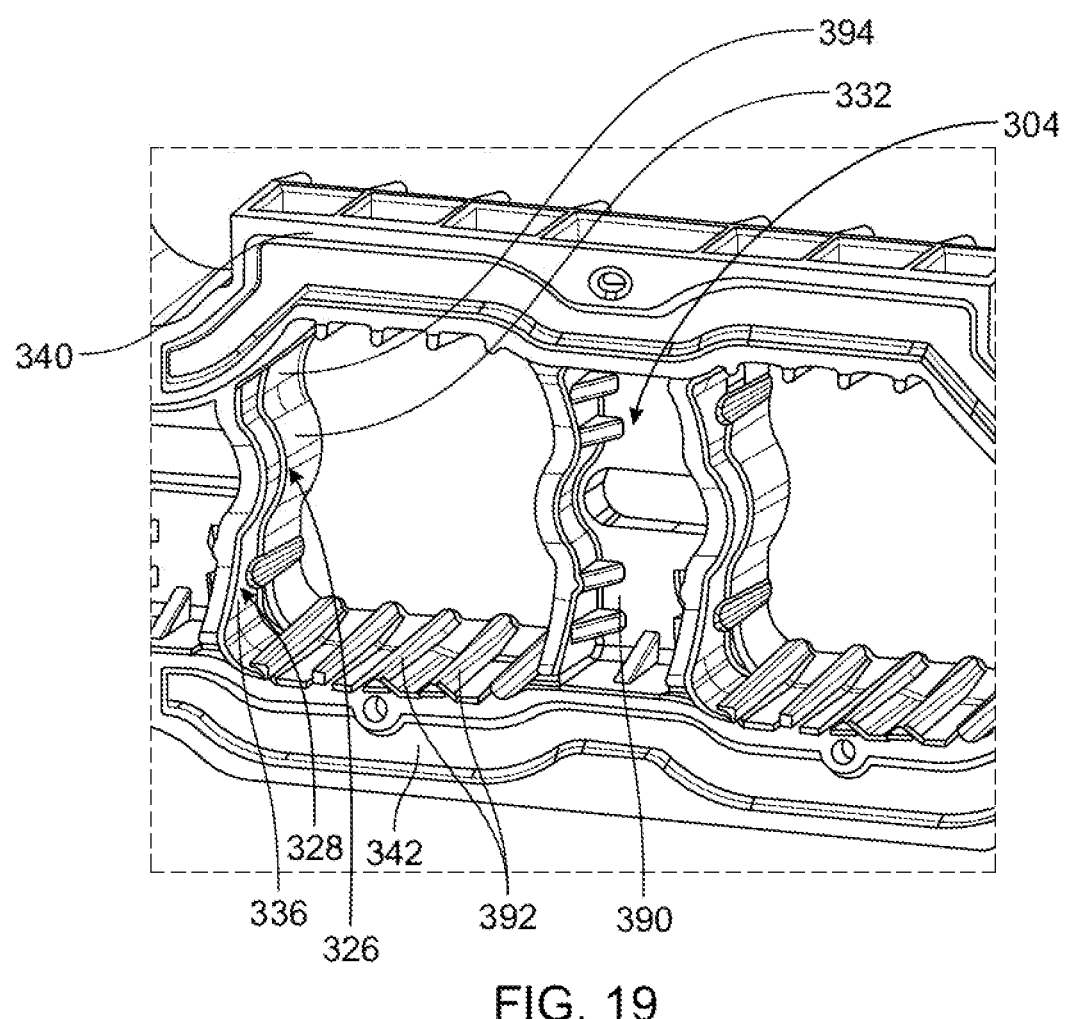
FIG. 19 is another top perspective view of the inner reinforcement structure with the first portion removed, in accordance with one embodiment of the present disclosure.
Figure 20:
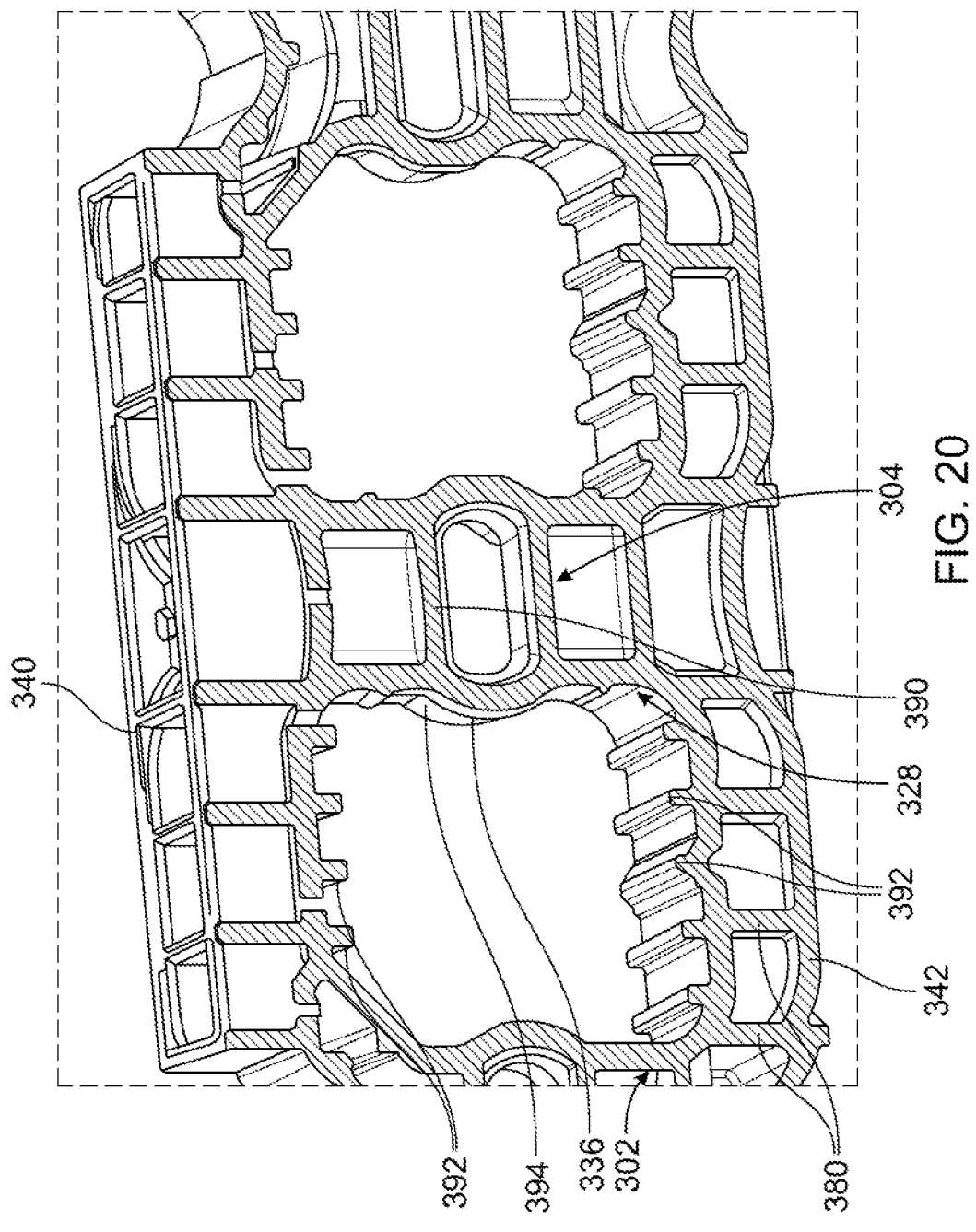
FIG. 20 is a top perspective view of a third portion of the inner reinforcement structure, in accordance with one embodiment of the present disclosure.
Figure 21:
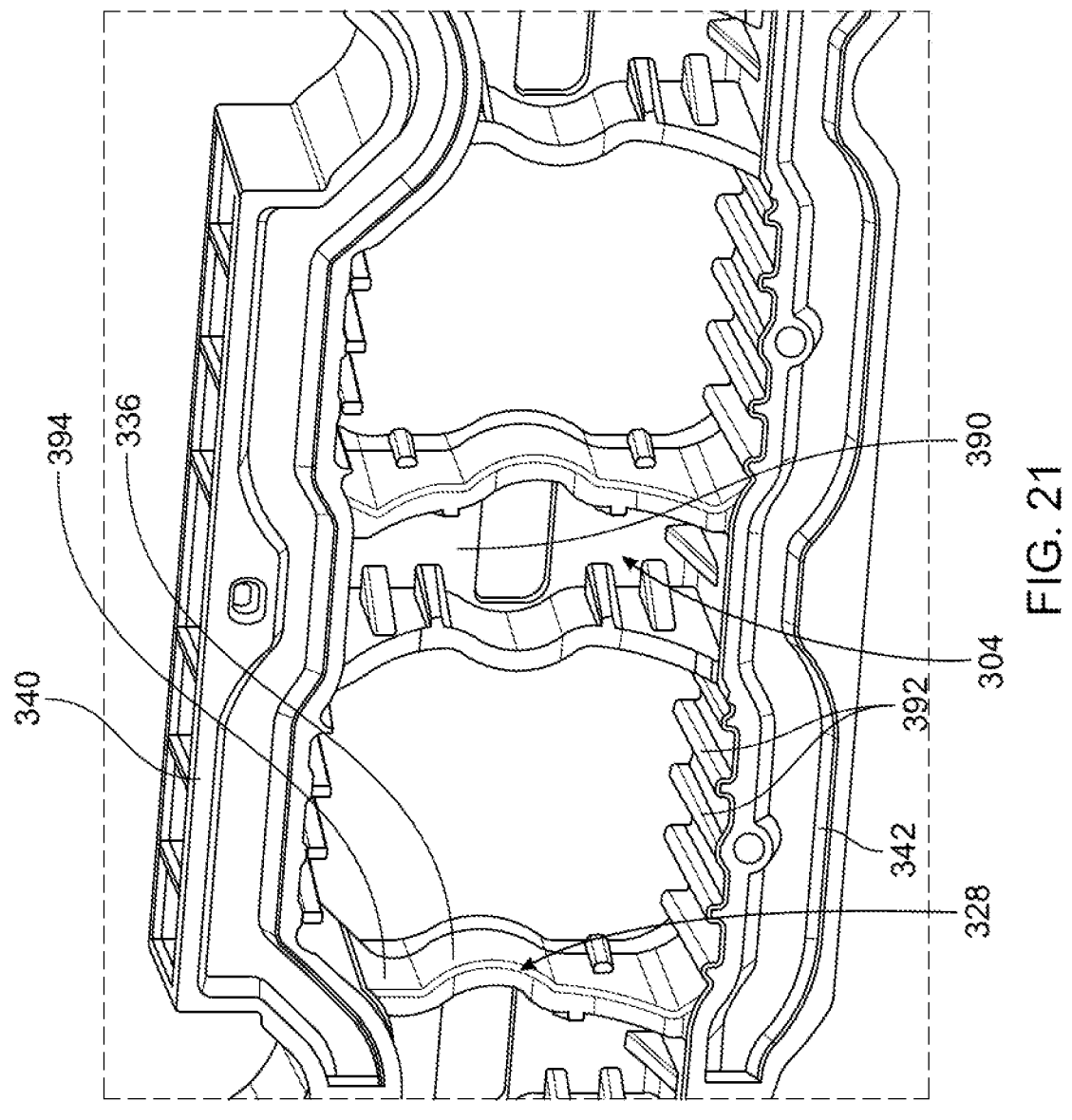
FIG. 21 is another top perspective view of the third portion of the inner reinforcement structure, in accordance with one embodiment of the present disclosure.

As shown in FIG. 15, the first wall structure 330 extends at a first angle 'E' relative to a horizontal axis 331, the second wall structure 332 extends at a second angle 'F' relative to the horizontal axis 331, while the third wall structure 336 extends at a third angle 'G' relative to the horizontal axis 331. Accordingly, the second wall structure 332 is arranged at an inclination relative to the first wall structure 330 and the third wall structure 336 is disposed at an inclination relative to the second wall structure 332. In the illustrated embodiment, the first angle 'E' is different from the second angle 'F', while the third angle 'G' is different from the second angle 'F'. In some embodiments, the first angle 'E' is different from both the second angle 'F' and the third angle 'G'.

Moreover, referring to FIGS. 13-21, each inner cone 302 includes a first flange 340 extending substantially perpen-dicularly i.e., vertically upwardly from the edge of the top wall portion 320 and a second flange 342 extending verti-cally downwardly from the edge of the bottom wall portion 322. As shown in FIG. 2, the first flange 340 and the second flange 342 are connected to the inner plate 134. Further, the inner cone 302 includes a pair of legs, for example, a first leg 350 and a second leg 352, configured to direct the impact load in desired directions to the frame 112 of the vehicle body 110. As shown, the first leg 350 is arranged aligned with the frame 112 and extends in the lateral direction towards the outer cone 202 from the tray shaped structure 306 and is attached to the first flange 340 and/or the top wall portion 320.

Similarly, the second leg 352 extends in the lateral direc-tion from the tray shaped structure 306 and is connected to the bottom wall portion 322 at a location disposed at a lateral offset from the second flange 342. In the illustrated embodi-ment, the second flange 342 and hence the second leg 352 is arranged aligned with a lower end of the connecting member 156. As shown, the first leg 350 includes a first foot 354 arranged at or proximate to a free end 356 of the first leg 350 and connected to the first flange 240 of the outer cone 202 arranged opposite to and facing the inner cone 302. In the illustrated embodiment, the first foot 354 extends verti-cally upwardly from a leg portion 358 that extends in the lateral direction from the tray shaped structure 306 i.e., and end of the wall 312. In the illustrated embodiment, the reinforcement assembly 160 includes two first inserts 180, 182 (shown in FIGS. 2 and 6) arranged between the first foot 354 of the inner cone 302 and the first flange 240 of the outer cone 202, and the panel 150 extends between the two first inserts 180, 182.

Further, as best shown in FIG. 15, the second leg 352 includes a leg portion 360 having a first leg structure 362 and a second leg structure 364, and a second foot 366 arranged at a free end 368 of the leg portion 360 and the connected to the leg portion 360. The first leg structure 362 extends vertically downwardly from the third wall structure 336 and is arranged at a lateral offset from the second flange 342 i.e., an end of the wall 312, while the second leg structure 364 extends in the lateral direction from the first leg structure 362 to the second foot 366. As shown, the free end 368 of the leg portion 360 extends beyond the base 308 of the inner cone 302 and is arranged relatively proximate to the panel 150 or the outer cone 202. Similar to the first foot 354, the second foot 366 extends substantially parallel to the second flange 342 and is coupled to the second flange 242 of the outer cone 202. The second leg 352 facilitates a transfer of impact load to the frame 112 via the connecting member 156, preventing a transfer of load to the battery compartment 120. The impact load transfers from the outer cone 202 to the second leg structure 364 via the second foot 366 and then to the tray shaped structure 306 via the first leg structure 362 and then to the frame 112 via the connecting member 156 and the second flange 342. In this manner, the transfer of impact load to the battery compartment 120 is minimized.

Moreover, in the illustrated embodiment, the reinforce-ment assembly 160 includes two second inserts 370, 372 (shown in FIG. 2 and FIG. 15) arranged between the second foot 366 of the inner cone 302 and the second flange 242 of the outer cone 202, and the panel 150 extends between the two second inserts 370, 372. Accordingly, the panel 150 is connected to the inner plate 134 and the outer plate 132, and extends between the two first inserts 180, 182 and two second inserts 370, 372, thereby separating the outer rein-forcing structure 200 and the inner reinforcing structure 300.

Furthermore, each inner cone 302 includes a plurality of outer ribs 380 outwardly from an outer surface 384 of the wall 312 and arranged between the wall 312. Moreover, the inner cone 302 includes a plurality of second ribs arranged between the first leg structure 362 and the second flange 342. The outer ribs 380 associated structure provides for differ-ential energy absorbing capacity for each of the zones. It may be appreciated that under the crush load or impact load, the first portion 324 or zone separates first along the junction from the second portion 326 absorbing some of the impact energy. Thereafter, depending on the impact load, the second portion 326 or zone separates from the third portion 328 when the impact load exceeds a second threshold value. It may be appreciated that due to the outer ribs 380 and a shear wall 390 of the second bridges 304, the third portion 328 provides a larger impact energy absorbing capacity. Addi-tionally, to increase the impact absorbing capacity of the inner reinforcement structure 300, each inner cone 302 includes inner ribs 392 arranged inside the pocket 314 and connected to the inner surface 394 of the wall 312.

The foregoing description of embodiments and examples has been presented for purposes of illustration and descrip-tion. It is not intended to be exhaustive or to limit the disclosure to the forms described. Numerous modifications are possible in light of the above teachings. Some of those modifications have been discussed and others will be under-stood by those skilled in the art. The embodiments were chosen and described in order to best illustrate certain principles and various embodiments as are suited to the particular use contemplated. The scope of the disclosure is, of course, not limited to the examples or embodiments set forth herein, but can be employed in any number of applications and equivalent devices by those of ordinary skill in the art. Rather it is hereby intended that the scope of the disclosure be defined by the claims appended hereto.

What is claimed is:

1. A reinforcement assembly for a side sill of a vehicle, the reinforcement assembly comprising:
a first reinforcement structure adapted to be arranged inside a cavity of the side sill and including a plurality of first cones configured to be arrayed in a longitudinal direction of the vehicle; and
a second reinforcement structure coupled to the first reinforcement structure and adapted to be arranged inside the cavity, the second reinforcement structure includes a plurality of second cones adapted to be arrayed in the longitudinal direction of the vehicle and arranged facing the plurality of first cones, each second cone includes
a tray shaped structure having a base arranged proximate to the first cone and a wall extending in a lateral direction away from the first cone, the wall includes a top wall portion and a bottom wall portion,
a first leg extending in the lateral direction from an end of the wall towards the base and connected to the top wall portion, and
a second leg connected to the bottom wall portion at a lateral offset from an end of the wall, wherein the second leg extends in the lateral direction from the bottom wall portion towards the base.

2. The reinforcement assembly of claim 1, wherein the plurality of first cones is engaged with the first legs and the second legs of the plurality of second cones.

3. The reinforcement assembly of claim 1, wherein each of the first leg and the second leg includes a leg portion extending in the lateral direction and a foot extending in a vertical direction from the leg portion.

4. The reinforcement assembly of claim 3, wherein the leg portion of the second leg includes a first leg structure connected to the bottom wall portion and extending in the vertical direction and a second leg structure extending in the lateral direction from the first leg structure.

5. The reinforcement assembly of claim 1 further comprising a panel extending between the first reinforcement structure and the second reinforcement structure and separating the first reinforcement structure from the second reinforcement structure.

6. The reinforcement assembly of claim 5, wherein the panel is engaged with the plurality of first cones and the plurality of second cones.

7. A side sill for a vehicle, comprising:
a first plate and a second plate arranged contacting the first plate and defining a cavity therebetween;
a first reinforcement structure arranged inside the cavity of the side sill and including a plurality of first cones adapted to be arrayed in a longitudinal direction of the vehicle; and
a second reinforcement structure coupled to the first reinforcement structure and arranged inside the cavity, the second reinforcement structure includes a plurality of second cones adapted to be arrayed in the longitudinal direction of the vehicle and arranged facing the plurality of first cones, each second cone includes
a tray shaped structure having a base arranged proximate to the first cone and a wall extending in a lateral direction away from the first cone, the wall includes a top wall portion and a bottom wall portion, a first leg extending in the lateral direction from an end of the wall towards the base and connected to the top wall portion, and
a second leg connected to the bottom wall portion at a lateral offset from an end of the wall, wherein the second leg extends in the lateral direction from the bottom wall portion towards the base.

8. The side sill of claim 7, wherein the plurality of first cones is engaged with the first legs and the second legs of the plurality of second cones.

9. The side sill of claim 7, wherein each of the first leg and the second leg includes a leg portion extending in the lateral direction and a foot extending in a vertical direction from the leg portion.

10. The side sill of claim 9, wherein the leg portion of the second leg includes a first leg structure connected to the bottom wall portion and extending in the vertical direction and a second leg structure extending in the lateral direction from the first leg structure.

11. The side sill of claim 7 further comprising a panel extending between the first reinforcement structure and the second reinforcement structure and separating the first reinforcement structure from the second reinforcement structure.

12. The side sill of claim 7, wherein the panel is engaged with the plurality of first cones and the plurality of second cones.

13. A vehicle, comprising:
a vehicle body including a frame; and
a side sill coupled to the frame and including
a first plate and a second plate arranged contacting the first plate and defining a cavity therebetween,
a first reinforcement structure arranged inside the cavity of the side sill and including a plurality of first cones arrayed in a longitudinal direction of the vehicle, and
a second reinforcement structure coupled to the first reinforcement structure and arranged inside the cavity, the second reinforcement structure includes a plurality of second cones arrayed in the longitudinal direction of the vehicle and arranged facing the plurality of first cones, each second cone includes
a tray shaped structure having a base arranged proximate to the first cone and a wall extending in a lateral direction away from the first cone, the wall includes a top wall portion and a bottom wall portion,
a first leg extending in the lateral direction from an end of the wall towards the base and connected to the top wall portion, and
a second leg connected to the bottom wall portion at a lateral offset from an end of the wall, wherein the second leg extends in the lateral direction from the bottom wall portion towards the base, wherein the first leg and the second leg are arranged to transfer an impact load to the frame.

14. The vehicle of claim 13, wherein the plurality of first cones is engaged with the first legs and the second legs of the plurality of second cones.

15. The vehicle of claim 13, wherein each of the first leg and the second leg includes a leg portion extending in the lateral direction and a foot extending in a vertical direction from the leg portion.

16. The vehicle of claim 15, wherein the leg portion of the second leg includes a first leg structure connected to the bottom wall portion and extending in the vertical direction and a second leg structure extending in the lateral direction from the first leg structure.

17. The vehicle of claim 13 further comprising a panel extending between the first reinforcement structure and the second reinforcement structure and separating the first reinforcement structure from the second reinforcement structure.

18. The vehicle of claim 13, wherein the panel is engaged with the plurality of first cones and the plurality of second cones.

19. The vehicle of claim 13, wherein each of the plurality of second cones includes a first flange extending vertically upwardly from the wall and a second flange arranged opposite to the first flange and extending vertically downwardly of the wall, wherein the first flange and the second flange are coupled to the second plate.

20. The vehicle of claim 13, wherein the first leg is aligned with the frame to enable a transfer of the impact load to the frame, and vehicle body defines a connecting structure extending obliquely upwardly from a location proximate to the second leg in the vertical direction to the frame, wherein the impact load is transferred to the frame from the second leg via the connecting structure.

* * * * *